United States Patent Office 3,541,887
Patented Nov. 24, 1970

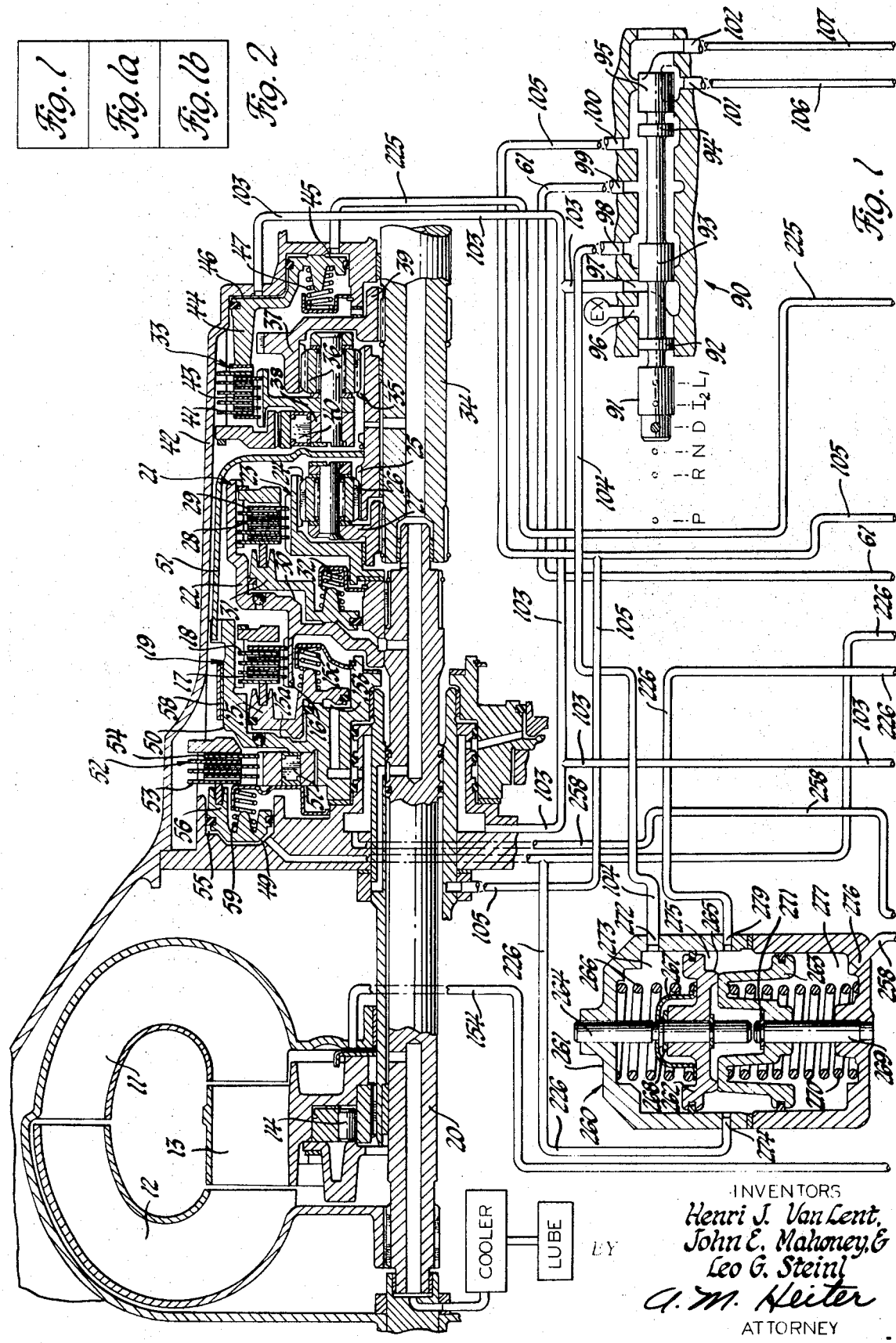

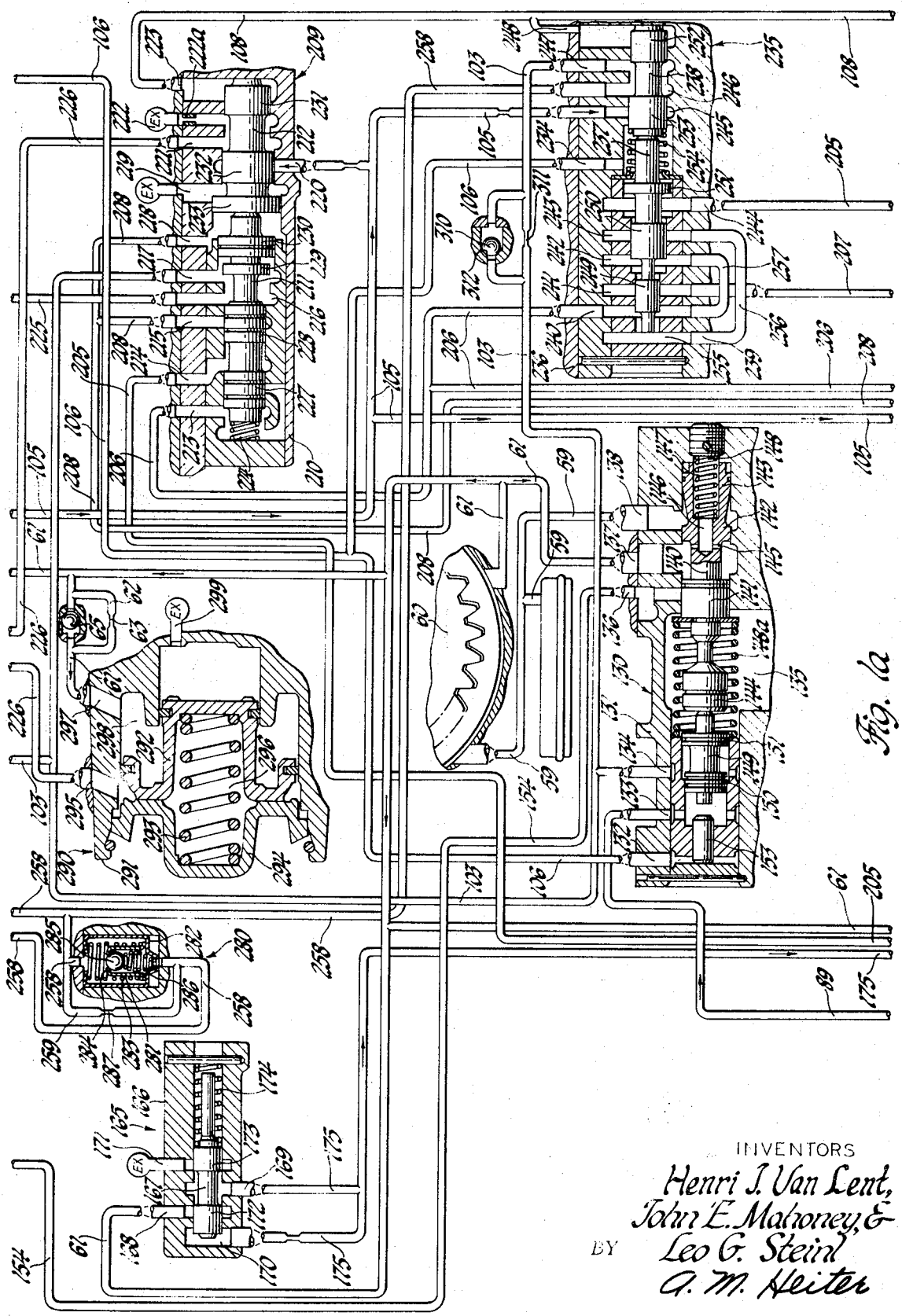

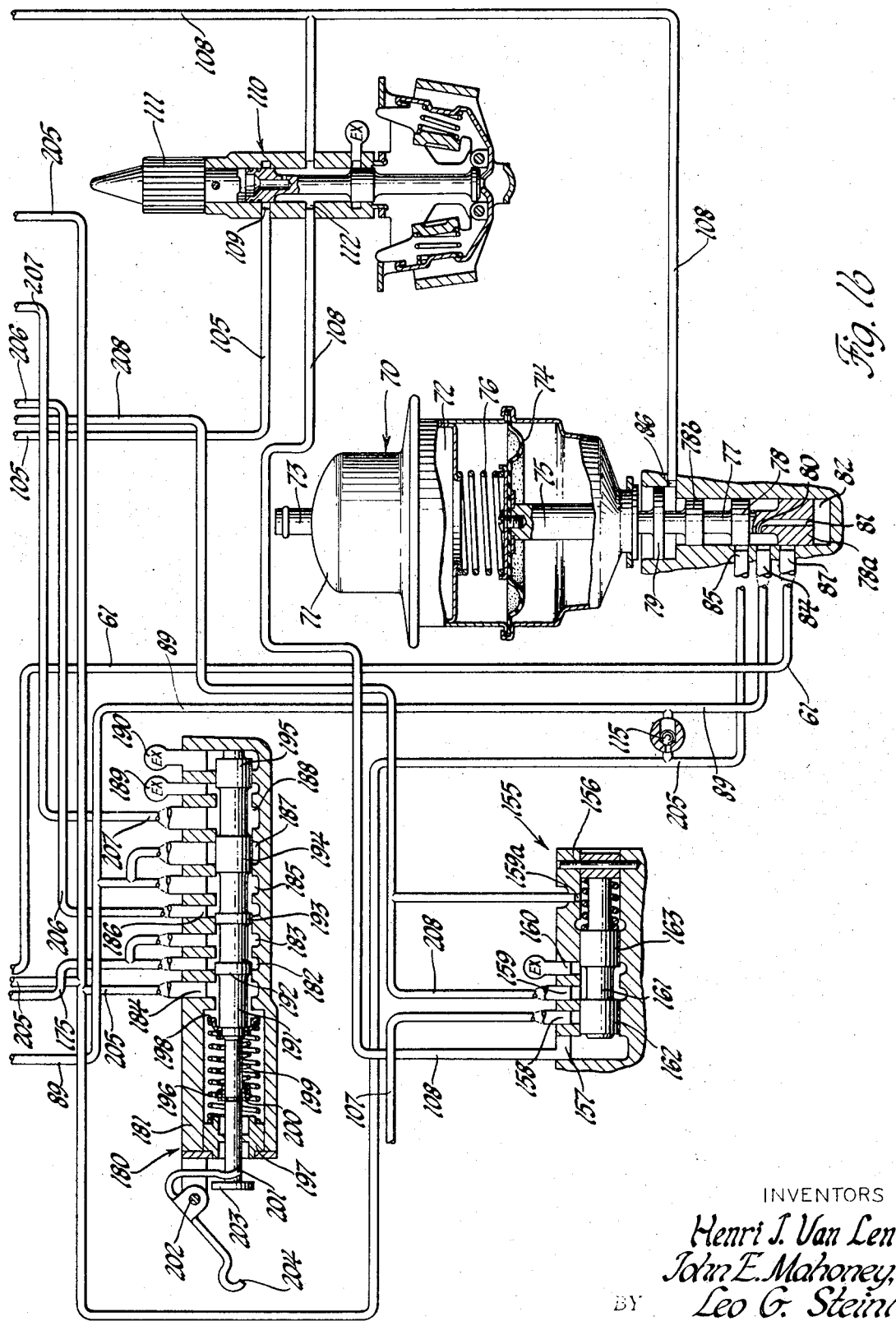

3,541,887
TRANSMISSION AND CONTROL
Henri J. Van Lent, Warren, John E. Mahoney, Bloomfield Hills, and Leo G. Steinl, Birmingham, Mich., assignors to General Motors Corporation, Detroit, Mich., a corporation of Delaware
Filed Mar. 28, 1969, Ser. No. 811,439
Int. Cl. F16h 57/10; G05g 19/00; B60k 71/10
U.S. Cl. 74—763                                        5 Claims

ABSTRACT OF THE DISCLOSURE

A transmission and control system wherein the transmission includes a casing, planetary gearing, a second speed disc brake and a one-way brake positioned at the forward end of the casing, a forward drive clutch, a direct drive clutch located intermediate the second speed disc brake and forward drive clutch and low gear brake means located rearwardly in the casing from the forward drive clutch, control features include accumulators and accumulative timing valves for providing smooth downshifts from direct to second gear drive and from second gear to first gear drive. Controls include a drive range selector valve for selecting drive, intermediate and low range operation. In drive range, overrun coast is provided in first and second gear. In intermediate range, second gear start can be provided with overrun coast braking. In low range, first gear start is provided with overrun coast braking in all forward drive ratios. A manually operable detent valve is movable through a first range of positions and to first and second detent positions. In the first detent position, which occurs before the carburetor throttle valve is fully open, modulation pressure, which is variable, is delivered to the second to third shift valve for downshifting the valve. In the second detent position, which occurs at full carburetor throttle opening, a fixed pressure controlled by a detent pressure regulator valve is delivered to the modulator valve to establish a minimum modulator pressure equal to the fixed pressure. A second to first gear detent valve, at speeds above a predetermined speed, blocks off delivery of the fixed pressure to the first to second shift valve to prevent downshift of the first to second shift valve. The fixed pressure will be delivered to the second to third shift valve through the detent valve to downshift the second to third shift valve.

An object of this invention is to furnish a transmission including planetary gearing and clutches and brakes for controlling the drive ratio including a second speed disc brake and one-way brake in series located at the forward end of the transmission case, a forward drive clutch spaced from the second speed brake, a direct drive clutch disposed in the space between the second speed disc brake and forward drive clutch, and a first gear forward drive one-way brake and a two-way low and reverse disc brake located rearwardly of the forward drive clutch and adjacent the rear end of the transmission case.

Another object of this invention is to provide an accumulator and an accumulative timing valve for providing an interval of slippage of the direct drive clutch discs during an upshift from second speed drive to prevent harsh engagement of the direct drive clutch discs when shifting from second speed to direct drive under power.

A further object of this invention is to provide an accumulative and accumulator control valve for providing an interval of slippage of the second gear disc brake during the interval of shift from first to second gear to prevent abrupt engagement of the second gear disc brake.

Another object of this invention is to provide a manually operable detent valve, a vacuum and atmospheric controlled modulator valve, and a detent pressure regulator valve, wherein the modulator valve is controlled by governor pressure, engine manifold pressure and atmospheric pressure to deliver modulator pressure to the detent valve, wherein the detent pressure regulator valve delivers a fixed pressure to detent the valve, wherein the detent valve is movable through a first range of motion to deliver modulator pressure to shift valves for biasing the shift valves toward their downshift position, wherein the detent valve is movable to a first detent position to deliver modulator pressure to the shift valve through two passages for biasing the shift valves to their downshift position, wherein the detent valve is movable to a second detent position to deliver a fixed pressure controlled by the detent pressure regulator valve to the shift valves for biasing the shift valves toward their downshift position.

These and other objects and advantages of this invention will be apparent from the accompanying specification and drawings in which:

FIG. 1 is a longitudinal sectional view of the transmission illustrating the gearing and particularly the arrangement of the various brakes and clutches for establishing different transmission shifts, together with portions of a schematic diagram of the hydraulic control system.

FIG. 1a is a schematic diagram of a second portion of the hydraulic control system.

FIG. 1b is a schematic diagram of a third portion of the hydraulic control system.

FIG. 2 is a diagram for FIGS. 1, 1a and 1b.

GEARING

Referring to FIG. 1, there is shown a transmission including an engine driven torque converter having an engine driven impeller 11, a turbine 12 and a reactor member 13. A one-way brake 14 prevents rotation of reactor member 13 and permits forward rotation of the same. A transmission power input shaft 20 driven by turbine 12 drives a clutch drum 22 of a forward drive clutch 21 and a clutch hub 16 of a direct drive and reverse clutch 19. A forward gear unit 23 includes a ring gear 24 and a sun gear 25 in mesh with a planet pinion 26 supported in a carrier 27 splined to a power output shaft 34. Drive clutch discs 28 on drum 22 are adapted to engage driven clutch discs 29 and ring gear 24 upon admission of fluid pressure to a servo chamber 30 formed between clutch drum 22 and a servo piston 31. A release spring 32 biases piston 31 toward its clutch release position.

A rear planetary gearing unit includes a sun gear 35 and a ring gear 37 in mesh with a planet pinion 36 supported in a carrier 38. Sun gear 35 is integral with sun gear 25 and ring gear 37 is fixed for rotation with output shaft 34 by a hub connection 39. A one-way brake 40 prevents rotation of planet carrier 38 in one direction and permits rotation of carrier 38 in the opposite direction. A disc brake 33, including discs 41 on housing 42 and discs 43 on carrier 38, may be engaged to prevent rotation of carrier 38 in either direction. Brake 33 is engaged when operating in reverse and low range forward operation. A piston 44 for actuating brake 33 is provided with two separate servo chambers 45 and 46 of different area. The smaller chamber 46 is adapted to receive fluid pressure when operating in low range and both chambers 45 and 46 are supplied with fluid when operating in reverse. The arrangement provides for smooth application of brake 33 when shifting into low range operation and also assures adequate brake capacity to handle the torque when shifting into reverse. A spring 47 biases the piston 44 toward the brake release position.

A drum 50 connected for rotation as a unit with sun gears 25, 35, by a connector 51, is adapted to be braked against rotation in one direction by a second gear disc brake 52 and a one-way brake 57 in series. Disc brake 52 which includes brake discs 53 and 54 may be engaged by a servo piston 56 upon admission of fluid under pressure to servo chamber 49. A spring 59 yieldably biases piston 55 to its brake release position. With brake 52 engaged, sun gears 25 and 35 are locked against rotation in one direction and are permitted to rotate in the opposite direction by one-way brake 57. A second gear overrun brake band 58 may, at times be applied to drum 50 to prevent rotation of sun gears 25 and 35 in either direction, particularly for engine braking during coasting.

A direct drive and reverse clutch 19 includes drive clutch discs 17 on clutch hub 16 and driven clutch discs 18 on drum 50. Discs 17 and 18 are energized by a piston 15 upon admission of pressure to a servo chamber 15a, a chamber 15b may be supplied with pressure to engage clutch 19 when operating in reverse. A spring 15c biases piston 15 towards its clutch release position.

For neutral operation, brake 52, clutches 19 and 21, and brake 33 are released. For first gear drive, forward drive clutch 21 is engaged. For second gear drive, second gear brake 52 and clutch 21 are engaged. Overrun brake band 58 may also be applied in second gear. For direct drive, clutches 19 and 21 are engaged. For reverse drive, clutch 19 and brake 33 are engaged.

In FIGS. 1, 1a and 1b, there is shown a schematic diagram of a hydraulic control system for controlling the transmission of FIG. 1.

An engine driven pump 60 (FIG. 1a) delivers oil under pressure through a passage 61 to a supply port 137 of a line pressure regulator valve 130, to a chamber 298 of a first to second shift accumulator 290 to charge the accumulator, to a supply port 87 of a modulator valve 70, to a supply port 168 of a detent regulator valve 165, to a supply port 99 of a manually operable drive range selector valve 90 hereinafter referred to as a manual valve.

MODULATOR VALVE

Modulator valve 70 (FIG. 1b) includes a housing 71 having a chamber 72 connected to a source of vacuum preferably the engine intake manifold through a nipple 73 and tubing connection, not shown. A diaphragm 74 secured to a plunger 75 is biased in opposition to vacuum in chamber 72 by a spring 76. A modulator valve member 77 is provided with equal diameter lands 78, 78a and 78b a larger diameter land 79. A pair of passages 80 and 81 in valve member 77 connect a chamber 82 beneath land 78a to a modulator pressure delivery port 84. Line pressure passage 61 supplies line pressure to a pressure supply port 87. Detent-exhaust port 85 and governor port 86 are also provided. The function of the modulator valve is to deliver variable pressure to a modulator pressure delivery passage 89, the pressure in passage 89 being increased upon decrease of effective manifold vacuum in chamber 72 and being decreased in response to rise of effective manifold vacuum in chamber 72. Maximum manifold vacuum will obtain in chamber 72 when the engine carburetor throttle valve (not shown) is closed and atmospheric pressure is maximum, and the effective manifold vacuum in chamber 72 will decrease in response to throttle valve opening and atmospheric pressure change. Thus, modulator pressure in passage 89 will be minimum at closed carburetor throttle valve setting and highest attainable altitude and will increase in response to opening of the engine carburetor throttle valve or decrease in altitude, or increased engine torque demand. A detent-2 passage 205 is connected to the detent-exhaust port 85 and a governor passage 108 is connected to governor port 86. The governor pressure in passage 108 is effective on the differential area between lands 79 and 78b to cause a decrease in modulator pressure as governor pressure increases. The detent-2 passage 205 is connected via a one-way check valve 115 to the modulator pressure passage 89. The function of check valve 115 will be described later with the discussion of the detent valve. During normal operation, passage 205 provides an exhaust for the modulator valve 70 to permit proper regulation of fluid pressure in passage 89.

DRIVE RANGE SELECTOR VALVE

A manually operable drive range selector valve 90 (FIG. 1) may be positioned to select park P, neutral N, drive range D, intermediate range I, low range L, or reverse R operation. Valve 90 is provided with lands 91, through 95 and with ports 96 through 102. Port 96 is an exhaust port. Port 97 connects to a reverse pressure delivery passage 103. Port 98 connects to a delivery passage 104 supplied with pressure whenever valve 90 is positioned to select reverse, neutral, or drive range operation. Port 99 connects to pump line pressure supply passage 61. Port 100 connects to a drive oil delivery passage 105. Port 101 connects to an intermediate range supply passage 106 and port 102 connects to a low range pressure delivery passage 107. With the manual valve positioned for drive range operation as shown, line pressure from passage 61 is admitted to passages 105 and 104.

Pressure in passage 105 is supplied to a port 109 of a governor 110 (FIG. 1b) to a port 220 of a first to second shift valve 209, (FIG. 1a) to a port 245 of a second to third shift valve 235 (FIG. 1a) and to servo chamber 30 of the forward drive clutch 21 to engage the clutch (FIG. 1). With clutch 21 engaged, the transmission is conditioned for first gear drive.

GOVERNOR

The governor 110 may be driven from the transmission power output shaft 34 by means of a gear 111. The governor may be of the same design as that described in the patent to Rosenberger 2,762,384 and is adapted to receive pressure from passage 105 through port 109 and deliver variable pressure to the governor pressure delivery passage 108 through port 112. The pressure in passage 108 increases with increase in vehicle speed as explained in the Rosenberger patent. Governor pressure in passage 108 is delivered to a port 223 of a first to second shift valve 209, to a port 248 of a second to third shift valve 235, to port 86 of a modulator valve 70 (FIG. 1a) and to a port 157 of a manual low control valve 155 (FIG. 1b).

LINE PRESSURE REGULATOR VALVE

A line pressure regulator valve 130 (FIG. 1a) includes a housing 131 provided with ports 132 through 138. Port 132 connects to intermediate range pressure delivery passage 106. Port 133 connects to modulator pressure delivery passage 89. Port 134 connects to reverse pressure delivery passage 103. Port 135 is an exhaust port. Port 136 connects to a converter pressure supply passage 154. Port 137 connects to line pressure supply passage 61, and port 138 connects to a pump suction passage 59.

A line pressure regulator valve member 140 is provided with lands 141, 142, 143 and an extension 144. Pump pressure from port 137 is admitted to a chamber 147 through passages 145, 146 in member 140, and acts on land 143 to bias the valve member 140 towards the left as viewed in the drawing. A spring 148 assists pressure in chamber 147. A spring 148a biases valve member 140 towards the right as viewed in the drawing. A first regulator plug 149 is formed to provide spaced lands 150 and 151 wherein land 151 is of greater diameter than land 150. A port 134 is adapted to admit pressure from reverse pressure delivery passage 103 into the space between lands 150 and 151 to boost the line pressure when operating in reverse. Modulator pressure from passage 89 acts on the end of land 150 to increase the line pressure in passage 61 in response to increase in modulator pressure. A plunger 153 of relatively small diameter as compared to land 150 is responsive to pressure delivered to port 132 from intermediate range passage 106 to boost the line pressure when operating in intermediate range position.

Port 136, connected to a converter supply passage 154, functions in such a manner as to supply pressure fluid to the converter before any other system is charged.

In normal drive range operation the line pressure will be controlled by and vary with modulator presure acting on land 150. In intermediate range operation, the line pressure will vary with changes in modulator pressure but will be greater than when operating in drive range operation. In reverse operation, the line pressure will be greater than in intermediate range operation.

When operating in intermediate range operation second speed start can be provided and the increased line pressure is used to accommodate second speed start. The reverse boost of line pressure is provided to accommodate the high torque of the reaction clutch which is energized in reverse.

MANUAL LOW CONTROL VALVE

A manual low control valve 155 (FIG. 1b) includes a housing 156 having ports 157, 158, 159, 159a and 160 and a movable valve member 161 provided with lands 162 and 163. A spring 164 biases valve member 161 towards its left hand position as viewed on the drawing. Port 157 connects to governor pressure delivery passage 108. Port 158 connects to low range pressure delivery passage 107 and ports 159 and 159a connect to a manual low control passage 208. Port 160 is an exhaust port. Governor pressure acting on the end of land 162 biases valve member 161 against spring 164. At speeds above a predetermined speed, valve member 161 will be positioned such that land 162 blocks off port 158 and passage 107, and passage 208 will be connected to exhaust through ports 159 and 160. At speeds below a predetermined vehicle speed, land 163 will block off exhaust port 160 and passages 107 and 208 will be connected to each other. Passage 107 is normally exhausted through the end of the drive range selector valve 180. However, in manual low operation which is describe later, line pressure in passage 107 is admitted to passage 208 through ports 158 and 159. Pressure in passage 208 is delivered through 159a to the right end of valve member 161 to assist the spring in biasing the valve 155 closed against any governor pressure in passage 108. If the manual shift valve 90 is moved to low above the predetermined speed, a shift to low range will not occur since passage 107 is blocked by land 162.

DETENT PRESSURE REGULATOR VALVE

A detent pressure regulator valve 165 (FIG. 1a) includes a housing 166 and a movable valve member 167. Ports 168 through 171 are provided in housing 166. Port 168 is a pressure supply port connecting to passage 61. Ports 169 and 170 each connect to a pressure delivery passage 175. Port 171 is an exhaust port. Valve member 167 is provided with lands 172 and 173 and is biased by a spring 174 against the pressure acting on the end of land 172. Valve 165 maintains a constant fixed pressure in detent valve pressure supply passage 175.

DETENT VALVE

A detent valve 180 (FIG. 1b) includes a housing 181 having ports 182 through 190 and a movable valve member 191 provided with spaced lands 192, 193, 194 and 195. A first spring 196 seated upon spring seats 197, 198 yieldably biases valve member 191 into housing 181 to its extreme right hand position shown in the drawing. A second spring 199 seated upon a spring seat 200 and upon seat 198 provides an additional resistance to movement of valve member 191 towards the left as viewed in the drawing after the valve member 191 has been moved far enough to the left to cause spring seat 200 to contact spring seat 197. A cam 201 pivoted at 202 and contacting a flange 203 and member 191 moves the valve member 191 to the left against spring 196 upon clockwise rotation of the cam. Cam 201 is caused to rotate clockwise by accelerator pedal actuated linkage (not shown) which acts upon arm 203 in response to depression of the accelerator pedal.

Ports 182 and 183 connect to detent pressure regulator valve delivery passage 175 and are supplied with a fixed pressure controlled by detent pressure regulator valve 165. Port 184 is a delivery port connected to a detent-2 delivery passage 205. Port 185 connects to modulator passage 89 and is supplied with variable pressure controlled by modulator valve 70. Port 186 is a delivery port connected to a delivery passage 206. Port 187 is connected to passage 89 and is supplied with modulator pressure. Port 188 is a delivery port connected to a delivery passage termed a detent-1 delivery passage 207. Ports 189 and 190 are exhaust ports.

In operation, with closed engine carburetor throttle, passage 205 is connected to exhaust through port 184 and the left-hand end of the valve bore. Land 192 blocks off port 182 from port 184. Land 193 blocks off port 186 from ports 182, 183. Modulator pressure is admitted from passage 89 to passage 206 through ports 185 and 186. Land 194 blocks off port 187. Passage 207 is connected to exhaust through ports 188 and 189.

As the accelerator pedal is depressed through a first range of movement, cam 201 moves valve member 191 against spring 196 to a detent-1 position wherein land 194 uncovers port 187 to admit modulator pressure from passage 89 to detent-1 passage 207. Modulator pressure will thereupon be effective in both passages 206 and 207. Upon further movement of valve member 191 against spring 196, spring seat 200 will abut the end of spring seat 197 whereupon spring 199 becomes effective to increase resistance to further movement of valve member 191 against the action of both springs 196 and 199. Due to this added resistance, further movement of detent valve member against the springs will occur only after the engine carburetor throttle valve has first been fully opened by depressing the accelerator pedal. Further depression of the accelerator pedal will then provide a full throttle detent shift which may be termed a D-2 shift. For a full throttle detent shift, passage 175 will be connected to detent-2 passage 205 through ports 182 and 184 to admit fixed pressure controlled by detent pressure regulator valve 165 to passage 205. Modulator pressure will be maintained in passage 206 and in detent-1 passage 207 unless the modulator pressure is less than the regulated detent pressure in passage 205. When the pressure in passage 89 is less than the pressure in passage 205, the check valve 115 permits the pressure in passage 205 to enter passage 89, thus maintaining a minimum modulator pressure during detent operation.

FIRST TO SECOND SHIFT VALVE

A first to second gear shift valve 209 (FIG. 1a) includes a valve body 210, a shift control valve 211 and a shift valve 212. Valve body 210 is provided with ports 213 through 223. Port 213 connects to modulator pressure delivery passage 206. Port 214 connects to detent-2 passage 205 connected to port 184 of detent valve 180. Port 217 connects to a reverse pressure supply passage 103. Port 216 connects to a low brake apply passage 225. Ports 218 and 215 connect to manual low control passage 208. Port 219 connects to exhaust but could be connected to an intermediate range pressure passage 106 if an intermediate start is desired. Port 220 connects to a drive range pressure passage 105. Port 221 connects to a first to second brake apply passage 226. Port 222 is an exhaust port and port 223 connects to governor pressure delivery passage 108.

Shift control valve 211 includes spaced lands 227, 228, 229 and 230. Lands 227 and 228 are the same diameter. Land 229 is of greater diameter than lands 227 and 228. Land 230 is of greater diameter than land 229. Shift valve 212 includes spaced lands 231, 232 and 233. Land 232 is of greater diameter than land 231 and land 233 is of greater diameter than land 232. A spring 224 biases the valve assembly to its downshift position shown in the drawing.

SECOND TO THIRD SHIFT VALVE

A second to third gear shift valve 235 (FIG. 1a) includes valve body 236, a second to third shift control valve 237 and a second to third shift valve 238. Valve body 236 is provided with ports 239 through 248. Shift control valve 237 is provided with spaced lands 249, 250, and 251, the land 250 being of greater diameter than land 249 and land 251 being of greater diameter than land 250. Shift valve 238 is provided with spaced lands 252 and 253. Land 253 is of greater diameter than land 252. A spring 254 biases shift valve 238 to its right hand or downshift position. Port 239 connects a chamber 255 at the end of land 249 to a passage 256. Port 240 is connected to passage 206. Port 241 connects to detent-1 passage 207. Port 242 connects to a passage 257 connected to port 240. Port 243 connects to passage 256 connected to port 239. Port 244 connects to detent-2 passage 205. Port 234 connects the chamber, in which spring 254 is located, to intermediate range pressure delivery passage 106. Port 245 connects to drive range pressure passage 105. Port 246 connects to a second to third speed clutch pressure delivery passage 258. Port 247 connects to reverse pressure passage 103. Port 248 connects to governor pressure delivery passage 108.

INTERMEDIATE RANGE OVERRUN BRAKE SERVO

A second gear overrun brake band actuator servo 260 (FIG. 1) for actuating overrun brake band 58 includes a housing 261, a servo piston 262 and an accumulator piston 263. A band actuator stem 264 may move outwardly with respect to housing 261 to apply band 58 to drum 50 through suitable bell crank linkage (not shown) when operating in intermediate range or low range operation. Brake band 58 is not applied to drum 50 when operating in reverse, neutral or drive range. Piston 262 is slidable on stem 264 and includes an annular boss 265 adapted to contact an accumulator piston 263. Stem 264 is biased inwardly with respect to housing 261 by a spring 266 seated on housing 261 and a spring seat 267 carried by stem 264. Piston 262 is adapted to contact a snap ring stop member 268 carried by stem 264. Accumulator piston 263 is slidably mounted on a fixed stem 269 and is biased toward contact with piston 262 by a spring 270, the upward range of movement of accumulator piston 263 being limited by a snap ring 271 carried by stem 269. Stem 269 is fixed in housing 261 and the upper end of stem 269, by abutting the end of stem 264, limits the range of movement of stem 264 into housing 261.

A port 272 admits line pressure from passage 104 into a spring chamber 273 above piston 262 when operating in reverse, neutral or drive range. Chamber 273 will be exhausted when operating in intermediate or low range operation. A port 274 admits pressure from the first to second brake apply pressure 226 to a chamber 275 between pistons 262 and 263 whenever the first to second shift valve 209 is in its upshift position. Piston 263 is an accumulator piston for cushioning the shift from second gear to direct drive and has no effect upon shift from first gear to second gear drive. A port 276 in housing 261 admits pressure from second to third gear clutch apply pressure 258 passage to a chamber 277 beneath piston 263 when the second to third shift valve 235 is in its upshift position to admit pressure to passage 258. Passage 226 extends from port 279 to a first to second gear shift accumulator 290.

SECOND TO THIRD GEAR ACCUMULATOR TIMING VALVE

A second to third gear accumulator timing valve 280 (FIG. 1a) is disposed in passage 258 to permit rapid fill of chamber 277 of accumulator piston 263 and to control the rate of discharge of fluid from chamber 277. A valve member 281 is spring biased to a closed position into contact with a valve seat 282 by a relatively heavy spring 283. Valve member 281 is shaped to form a valve seat 284 adapted to receive a ball valve 285. A relatively light spring 286 biases ball valve 285 into contact with seat 284. A bypass passage 259 around the valves is provided with a restriction 287.

In operation, upon movement of the second to third speed shift valve 235 to its upshift position, fluid pressure being admitted to servo chamber 277 will move ball valve 285 off its seat and quickly fill chamber 277. When the shift valve 235 moves to its downshift position and connects passage 258 to exhaust, ball valve 285 will be seated upon seat 284. If the pressure in chamber 277 is above a predetermined pressure, valve member 281 will move momentarily against spring 283 to permit fluid flow past seat 282. Upon a drop of pressure in chamber 277 below the above-mentioned predetermined pressure, valve member 251 will be seated upon seat 282 such that discharge of pressure from chamber 277 is through bypass passage 259 and restriction 287. In shifting from direct drive or third gear to second gear, it is desirable that the release of direct drive clutch 19 be gradual to provide a shifting contact of clutch discs 17 and 18 for a short time interval rather than an instantaneous release of the direct drive clutch. Accumulator piston 263 will stroke against spring 270 in response to second gear brake pressure in chamber 275 and deliver pressure from chamber 275 to passage 258. The valve 280 permits an initial quick exhaust of pressure above a predetermined pressure and thereafter a further restricted discharge of pressure from chamber 277 through restriction 287 to delay complete release of clutch discs 17 and 18 with increasing relative clutch disc slippage as the pressure continues to drop in passage 258. This provides a smoth downshift from third to second gear drive, by permitting smooth lockup of one-way brake 57 without shock. The timing valve 280 can be replaced with a one-way check valve in parallel with a restriction if desired.

FIRST GEAR TO SECOND GEAR ACCUMULATOR

A first gear to second gear shift accumulator 290 (FIG. 1a) includes a housing 291 and a piston 292 biased to its right-hand position by a spring 293, seated upon an end cover 294. A port 295 connects second speed disc brake apply passage 226 to a chamber 296. A port 297 connects pump line pressure passage 61 to a chamber 298. Port 299 is an exhaust port.

Line pressure is supplied to chamber 298 through passage 61 to charge the accumulator at all times when pump 60 is driven. A ball check valve 65 and a bypass restriction 63 are disposed in parallel relationship in passage 61 and branch passage 62. Fluid under pressure is admitted to chamber 298 without restriction through open check valve 65. However, discharge of fluid from chamber 298 will be through restriction 63, and branch passage 62 with check valve 65 seated upon seat 64.

Upon admission of fluid pressure to second speed disc brake servo apply passage 226, fluid passes through chamber 275 of overrun brake band servo 260 to chamber 296 of servo 290. Pressure in chamber 296 plus the spring force of spring 293 will cause piston 292 to move to its right-hand position against the effect of pressure in chamber 298. Upon downshifting from second gear drive to first gear drive, passage 226 will be connected to exhaust through restriction 222a in port 222 of shift valve 209. Line pressure in chamber 298 will cause piston 292 to stroke against spring 293 to feed fluid through passage 226 to thereby control the release of second speed disc brake 52 to provide a time interval of brake disc slippage rather than an instantaneous release of the brake disc. This provides a smooth downshift from second to first gear drive. If additional shift time is desired, a timing valve similar to valve 280 can be used.

OPERATION—NEUTRAL

With the manually operated drive range selector valve 91 positioned for neutral operation, line pressure in passage 61 will be admitted to passage 104 through ports 99 and 98. Reverse passage 103 is blocked off from pressure in passage 104 by land 93 and is exhausted through ports 97 and 96. Drive pressure passage 105 is blocked off from port 99 by land 94 and is connected to exhaust through port 100 and the end of the valve bore. Intermediate range pressure passage 106 and low range pressure passage 107 are connected to exhaust through the end of the valve bore through ports 101 and 102, respectively. With servo chamber 30 of the forward drive clutch connected to exhaust through passage 105, port 100 and the end of the valve bore, no power can be transmitted through the gearing and the transmission is conditioned for neutral operation.

OPERATION—DRIVE RANGE FIRST GEAR

With the drive range selector valve positioned for drive range operation, pressure will be admitted from line pressure passage 61 to drive passage 105 through ports 99 and 100. Pressure in passage 105 is admitted to servo chamber 30 to apply forward drive clutch 21. With clutch 21 engaged, the transmission is conditioned for first or low gear drive. With ring gear 24 rotated forwardly, due to the vehicle load on output shaft 34, carrier 27 tends to resist rotation and sun gears 25 and 35 are driven in reduction drive of the front gear unit in reverse. One-way brake 40 locks up to prevent rotation of rear unit carrier 38 under power and ring gear 37 is driven forwardly in reduction drive. In low gear there is provided a compound reduction drive through both gear units. On overspeed or torque reversal, one-way brake 40 will automatically release.

DRIVE RANGE—SECOND GEAR DRIVE

At some vehicle speed depending upon torque demand the first to second shift valve 209 will move to its upshift or second gear position. Governor pressure acting upon the end of land 252 of the second to third shift valve member 238 tends to move the shift valve to its upshift position. Spring 254 biases the valve member 238 towards its downshift position. Modulator pressure from valve 70 and passage 89, at closed throttle and intermediate throttle positions is admitted through ports 185 and 186 of detent valve 180 to passage 206 and delivered to port 240 of the second to third speed shift control valve and acts on land 249 and the differential area of lands 250 and 249. assist spring 254 to maintain the second to third shift valve in its downshift or second gear position.

Modulator pressure is also conducted through passage 206 to port 213 of the first to second gear shift control valve 211 and acts upon the end of land 227 and assists spring 224 to bias the first to second shift valve 212 to its downshift or first gear position. Governor pressure acting on the end of land 231 biases the shift valve 212 towards its upshift or second gear position. At some vehicle speed depending upon the effective modulator pressure, the first to second shift valve will upshift to its second gear drive position and will deliver pressure from drive passage 105 to disc brake apply passage 226, through ports 220 and 221. Pressure in passage 226 is admitted to disc brake servo chamber 49 to apply brake 52 and, as heretofore explained, is admitted to chamber 296 of the second to first gear accumulator 290. With disc brake 52 engaged, the transmission is conditioned for second gear drive. One-way brake 57 locks up to prevent rotation drum 50 and sun gears 25 and 35 under engine troque. Ring gear 24 is driven through forward clutch 21, sun gear 25 is held against rotation by one-way brake 57, and carrier 26 drives output shaft 34 at reduction drive of the front gear unit for second gear drive. Due to the differential area of lands 232 and 231, pressure delivered to passage 226 assist governor pressure to bias valve 212 to its upshift position to prevent "hunting" between second and first gear.

During application of second speed brake 52, pressure in chamber 296 of accumulator 290 assists spring 293 to cause piston 292 to stroke against the effect of pressure in chamber 298 to assure smooth engagement of disc brake 52.

DRIVE RANGE—THIRD GEAR

Upon further increase in vehicle speed, the second to third shift valve will upshift to its third speed or direct drive position. Pressure from drive passage 105 is admitted through ports 245, 246 to direct drive clutch apply passage 258 to servo chamber 15b of the direct drive clutch to engage clutch 19. Pressure from passage 258 is also admitted to chamber 277 of the third to second gear downshift accumulator 260. Pressure in chamber 277 will assist spring 270 to move piston 263 against the effect of pressure in chamber 275 to assure a gradual pressure rise in passage 258 and smooth engagement of clutch 19. With forward clutch 21 and direct drive clutch 19 engaged, the transmission is in direct drive. Due to the differential area of land 253 and 252, pressure delivered to passage 258 will assist governor pressure to bias valve 238 to its upshift position to prevent "hunting" between third and second gear.

NORMAL CLOSED THROTTLE THIRD TO SECOND GEAR DOWNSHIFT

Assuming the second to third shift valve is in its upshift third speed position, land 249 blocks off modulator pressure from passage 206 at port 240. Chamber 255 at the end of land 249 will be connected by way of port 239 and passage 256 to the space between lands 250 and 251; which space is connected through port 244 to detent-2 passage 205. At closed throttle, passage 205 is connected to exhaust through port 184 and one end of the valve bore of detent valve 180. Also with the shift valve 238 in its upshift position, the space between lands 249 and 250 is connected through port 241 to detent-1 passage 207. At closed throttle, passage 207 is connected to exhaust through ports 188 and 189 of detent valve 180. Thus at closed throttle, modulator pressure is not effective to bias the second to third shift valve towards its downshift position. Only spring 254 biases the shift valve 238 towards its downshift position. Governor pressure acting on the end of land 252 and line pressure acting on the differential area of lands 252 and 253 bias the shift valve towards its upshift position. Closed throttle third to second downshifts will occur at relatively low vehicle speeds.

Upon a downshift from third to second gear, modulator pressure from passage 206 is admitted to chamber 255 at the end of land 249 and through passage 257 to the space between lands 249, 250. Modulator pressure acts on land 249 and the differential area of lands 249, 250 to bias shift control valve 237 and shift valve 238 to their downshift position. Modulator pressure in passage 256 is blocked off by land 250.

With shift valve 238 in its downshift position direct drive clutch apply passage 258 is connected to exhaust through ports 246, 247, reverse pressure passage 103 and ports 97 and 96 of drive range selector valve 91.

It will be noted that a one-way ball check valve 310 is connected in parallel with a restriction 311 in passage 103. When operating in drive range operation, ball check valve 310 will close upon a downshift from third to second gear such that fluid being exhausted from the direct drive clutch servo chamber 15b is exhausted through restriction 311, as therefore explained. Second speed disc brake apply pressure in chamber 275 of the third to second gear accumulator 260 biases accumulator piston 263 against spring 270. In downshifting from third to second gear drive, ball valve 285 will be closed and valve member 281 will be seated to cause discharge of pressure from accumulator chamber 277 through restriction 287 during the interval of release of the direct drive clutch. Piston 263 strokes against spring 270 to feed oil from chamber 277 to passage 258. Restriction 311 delays the exhaust fluid through passage 103 and 258 after the second to third shift valve moves to its downshift position. Thus, restriction 287 and 311 coact upon a downshift to provide a time period during which slippage of the clutch discs occurs during downshift to smooth up the direct drive to second gear drive downshift. When downshifting from third to second gear, the ball valve 310 will be seated upon seat 312 to cause discharge of fluid through restriction 311 in passage 103.

NORMAL CLOSED THROTTLE SECOND TO FIRST GEAR DOWNSHIFT

With the first to second shift valve in its upshift position, and with a closed throttle, modulator pressure from passage 206 is admitted to port 213 of shift control valve 211 where it is blocked off by land 227. Passage 206 is supplied with modulator pressure from passage 89 through ports 185, 186 of detent valve 180 at closed throttle. Thus at closed throttle operation, and with the transmission in second gear drive, only the force of spring 214 biases the first to second control valve 211 and shift valve 212 toward their downshift position. Governor pressure acting on the end of land 231 and second speed disc brake apply pressure acting upon the differential area of lands 232 and 231 of downshift valve 212 bias the shift valve towards its upshift position. At closed throttle, line pressure is minimum and at some relatively low vehicle speed, spring 214 will be effective to move shift control valve 211 and shift valve 212 to their downshift position.

Upon downshift of valve 212, passage 226 will be exhausted through ports 221, 222 and restriction 222a. Pressure will be released from disc brake servo chamber 55 with the second to first gear accumulator piston 292 stroking against spring 293 to deliver pressure to passage 226. This supply of fluid to passage 226 by accumulator 290 plus the restriction to exhaust of fluid through port 222 of shift valve 209 afforded by restriction 222a controls the rate of release of brake discs 53 and 54 to provide a time interval during which the discs are maintained in friction slip contact to smooth the transition from second to first gear drive.

PART THROTTLE FORCED THIRD TO SECOND DETENT DOWNSHIFT

A part throttle forced downshift from third to second gear drive may be accomplished under control of detent valve 180. By depressing the accelerator pedal, valve member 191 may be moved against spring 196 to its part throttle forced downshift or detent-1 position wherein member 200 contacts stop 197, but spring 196 is not compressed. In this position, modulator pressure from passage 89 is admitted to passage 206 through ports 185 and 186 and to detent-1 passage 207 through ports 187 and 188 of detent valve 180. Assuming the second to third shift control valve is in its upshift position, modulator pressure from passage 206 is blocked off by land 249 at port 240 and chamber 255 is connected to exhaust through passage 256, port 243, port 244, detent-2 passage 205 and port 184 and the end of detent valve 180. Thus, only spring 254 is tending to bias shift valve 238 to its down-shifted position while direct drive clutch pressure acting on the differential area of lands 253 and 252 and governor pressure acting on the end of land 252 bias the shift valve 238 to its upshift position.

Now assuming that detent valve 180 is in its detent-1 position at part engine throttle opening, modulator pressure from passage 89 is admitted through ports 187 and 188 of detent valve 180 to detent valve 180 to detent-1 passage 207, with exhaust port 189 blocked off by land 195. Modulator pressure from passage 207 is admitted through port 241 of the shift control valve 237 to the space between lands 249 and 250 and acts on the differtial area of these lands to bias the shift valve to its downshift position. Part throttle forced downshift of the shift valve 238 will occur when the detent-1 pressure plus spring 254 are effective to overcome the effect of direct drive clutch pressure acting on the differential area of lands 253, 252 plus governor pressure tending to maintain the shift valve 238 in its upshift position. The action of the third to second downshift accumulator has heretofore been described.

FULL THROTTLE THIRD TO SECOND DETENT DOWNSHIFT

A full throttle forced downshift termed a detent-2 downshift may also be obtained for shift from third to second gear drive by depressing the accelerator pedal past full open engine throttle position. In accomplishing a full throttle downshift spring seat 200 remains in contact with spring seat 197 such that spring 199 offers an additional resistance to moving to the full throttle forced downshift position. This added resistance is overcome by conscious effort of the operator due to the additional force which must be applied to the accelerator pedal to move the detent valve to its detent-2 position.

With detent valve 180 in its detent-2 position, fixed pressure from passage 175 controlled by detent pressure regulator valve 165, passes through ports 182 and 184 to detent-2 passage 205 and through ports 183 and 186 to passage 206. This fixed pressure in D-2 passage 205 acts upon the differential area of lands 250 and 251 to bias shift control valve 237 and shift valve 238 toward their downshift or second speed position. Fixed pressure from passage 206 is blocked off by land 249 when valve 237 is in its upshift position. Upon movement of valve towards its downshift position, fixed pressure from passage 206 enters chamber 255 and 257 to the space between lands 249 and 250. Thus, fixed pressure from passage 206 acts upon the end of land 249 and the differential area of lands 249 and 250 to bias valves 237 and 238 to their downshift or second speed position. Upon downshifting, passage 258 is connected to exhaust through ports 246 and 247, reverse passage 103 and ports 97 and 96 of manual valve 91. Accumulator piston 263 will stroke against spring 270 to feed fluid through restriction 287 to provide an interval of slippage of clutch discs 17 and 18 as the discs release such that one-way brake 57 may lock up smoothly under heavy torque full throttle forced downshift operation.

It will be apparent that the full throttle forced downshift will occur at a higher speed than the part throttle forced downshift and that the third to second accumulator will still function to delay release of the direct drive clutch for smooth third to second downshift.

FULL THROTTLE SECOND TO FIRST DOWNSHIFT

As heretofore stated, at part throttle operation with the detent valve in its D-1 position, modulator pressure from passage 89 is admitted through ports 185 and 186 of detent valve 180 to passage 206 and to port 213 of first to second shift control valve 211. With the shift control valve in its upshift position, land 227 blocks off port 213 such that the modulator pressure is of no effect. A part throttle second to first gear shift cannot be accomplished.

A full throttle or detent-2 forced downshift may be accomplished assuming the detent valve 180 is moved to its detent-2 position, fixed pressure in passage 175 controlled by detent pressure regulator valve 165 is admitted to passage 206 through ports 183 and 186 and is admitted to passage 205 through ports 182 and 184. This fixed pressure in passage 205 is conducted to port 215 of first to second shift control valve 211. The fixed pressure is admitted from passage 205 through port 214 to the space between lands 227 and 228. This fixed pressure acts on the differential area of lands 227 and 228 and on the left end of land 227 to bias shift control valve 211 and shift valve 212 to their downshift position. Second speed brake passage 226 is connected to exhaust through ports 221 and 222 of shift valve 212 to release the disc brake. The second to first downshift accumulator piston 292 strokes as heretofore described to provide a time interval of friction slippage brake disc control to provide smooth shift from second to first.

INTERMEDIATE RANGE OPERATION

The transmission may be operated in intermediate range for second gear overrun braking. When operating in drive range, there is no overrun braking in either first gear or second gear operation.

With drive range selector valve 91 positioned for intermediate range operation, reverse, neutral, drive passage 104 is blocked off from line pressure 61 by land 93 and is connected to exhaust through ports 98 and 96 of the manual valve. Line pressure is admitted to drive passage 105 through ports 99 and 100 and to intermediate range passage 106 through ports 99 and 101. Intermediate range passage 106 is connected to port 132 of pressure regulator valve 130 and acts on the end of regulator plug 153 to cause the regulator valve 130 to maintain a higher line pressure than the range of pressures delivered when operating in drive range operation. The line pressure in passage 61 will still vary with changes in modulator pressure acting upon land 150 of regulator plug 149 but will be a higher range of pressures than that existing when operating in drive range operation. Passage 106 is also connected to port 234 of second to third shift valve 238 such that line pressure acts on the end of land 253 to bias the shift valve 238 to its downshift or second speed position. With the shift valves thus positioned, the transmission is conditioned for low speed start with automatic upshift to second speed and is also conditioned for overrun braking in second gear.

Line pressure from drive passage 105 is admitted through 220 and 221 of 1-2 shift valve 212 to passage 226, on an upshift from first to second, and to servo chamber 55 of disc brake 52 to apply brake discs 53 and 54. Pressure from passage 226 is also admitted to chamber 275 of overrun band servo 260 and to chamber 296 of second to first downshift accumulator 290. Piston 292 will move against the effect of pressure in chamber 298 to delay engagement of brake band 58 until brake discs 53 and 54 have first been engaged. With no pressure in chamber 273 and with pressure in chamber 275 of brake band servo 260, piston 262 is effective to apply brake band 58 to drum 50 for two-way braking of drum 50 and sun gears 25 and 35. Band 58 is applied to drum 50 after brake discs 53 and 54 and one-day brake 57 have stopped rotation of drum 50 for smooth shift into intermediate range second gear drive. With band 58 engaged, overrun braking in second gear is accomplished. Forward clutch 21 is engaged by pressure in passage 105 in the same manner as when operating in drive range.

An upshift from second gear to direct drive is not possible since governor pressure in passage 108 will never be sufficient to overcome the effect of line pressure admitted to the end of land 153 through port 234 of the second to third shift valve. This is particularly useful in descending hills where it is desirable to remain in second gear drive. A second gear start can be provided if the control is modified to connect the intermediate range passage 106 to port 219 of the first to second shift valve 212 so that pressure in passage 106 acts on the differential area of lands 233 and 232 to bias the shift valve 212 to its upshift or second speed position.

LOW RANGE OPERATION

With the drive range selector valve positioned for low range operation, line pressure is admitted to drive passage 105 through port 100 to intermediate range passage 106 through port 101 and to low range passage 107 through port 102. Pressure in low range passage 107 is admitted through ports 158 and 159 of the manual low range control valve 155 and low control passage 208 to ports 215 and 218 of control valve 209 where the pressure acts on the land 233 and 230 to bias the shift control valve 211 and shift valve 212 to their upshift and downshift positions respectively. Low range pressure from low control passage 208 is admitted through ports 215 and 216 of valve 211 to low brake apply passage 225. Pressure from passage 225 is admitted to chamber 46 of the low gear disc brake to apply disc brakes 41 and 43. It will be noted that two servo chambers 45 and 46 are associated with piston 44 and that fluid pressure is applied only to chamber 46 when operating in low range. The chamber 46 is of limited size and is selected to provide only adequate braking capacity as required for first gear operation to assure a smooth shift when shifting into low range first gear drive. An upshift from first to second gear low range drive will not occur since line pressure acting on land 223 cannot be overcome by governor pressure in passage 108.

REVERSE OPERATION

With the drive range selector valve positioned for reverse operation, drive passage 105 is connected to exhaust through port 100 and one end of the selector valve; intermediate range passage 106 and low range passage 107 are connected to exhaust through ports 101 and 102 respectively, and the same end of the selector valve. Line pressure is admitted to passage 104 through ports 99 and 98 and to reverse brake apply passage 103 through ports 99 and 97. Forward clutch 21 is released through passage 105. Line pressure in passage 103 is admitted to chamber 15a to cause clutch servo piston 15 to apply clutch discs 17 and 18. Passage 103 is also connected to chamber 46 of disc brake 40 and to port 217 of the first to second shift valve assembly 209. Pressure entering port 217 between lands 228 and 230 is directed to passage 225. Pressure acting on the differential area between lands 228 and 230 biases shift valve 212 and shift control valve 211 to the downshift position. Passage 225 admits pressure to chamber 45 of piston 44. Thus in reverse operation, both chambers 45 and 46 of servo piston 44 are supplied with fluid to engage brake discs 40 and 41. A ball check valve 310 and a restriction 311 are disposed in parallel in passage 103. Upon shifting into reverse, ball check valve 310 will be open to permit unrestricted fluid flow to port 137 of shift valve 238.

It will be apparent that when operating in drive range, overrun braking will be had in direct drive with overrun coast in second and first gear drives. In intermediate drive range, initial start is in first gear with overrun braking in second gear. In low range operation, overrun braking is provided. The specific arrangement of the second gear disc brake and one-way brake 57 at the forward end of the casing with the direct drive clutch and second speed overrun brake positioned intermediate the second speed disc brake and forward drive clutch is believed novel. The specific arrangement of the detent valve having the two detent positions and its relationship with the modulator valve, the detent regulator valve, second to first detent valve and shift valves provides improved shift control. The second speed brake accumulator, direct drive clutch accumulator and the accumulator control valves provide an interval of slippage of direct drive clutch discs 17 and 18 to prevent harsh engagement of one-way brake 57 on downshift from direct drive to second speed and an interval of slippage of brake discs 53 and 54 to prevent harsh engagement of one-way brake 40 when shifting into low gear under engine power.

Modifications may be made of the above described illustrative embodiments by those skilled in the art without departing from the invention.

What is claimed is:

1. In a transmission for providing a plurality of forward drive ratios, neutral and reverse, a casing, a drive shaft, a driven shaft, a first planetary gear set including a planet carrier supporting a planet pinion in mesh with a ring gear and a sun gear, said carrier being fixed for rotation with said driven shaft, a second planetary gear set including a planet carrier supporting a planet pinion in mesh with a second ring fixed for rotation with said driven shaft, said second sun gear being fixed for rotation with said first sun gear, a one-way brake for preventing rotation of said second carrier in one direction, a selectively engageable disc brake for preventing rotation of said second carrier in any direction when engaged, a first engageable and releasable clutch effective when engaged to connect said first gear set ring gear to said drive shaft, a second engageable and releasable clutch effective when engaged to connect said drive shaft to both of said sun gears, a disc brake and a one-way brake in series effective when said disc brake is engaged to prevent rotation of both of said sun gears, said second clutch being positioned intermediate said last-mentioned disc brake and said first clutch in said casing, and a brake band effective when engaged to prevent rotation of both of said sun gears in any direction.

2. A transmission as set forth in claim 1 having control valving for controlling engagement and release of said clutches and brakes and including a drive range selective valve adapted to be positioned to select drive range, intermediate range and low range operation, fluid pressure responsive servos associated with each of said clutches and said disc brakes for engaging said clutches and disc brakes in response to supply of fluid pressure thereto, and band servo for engaging said band in response to supply of pressure thereto, a fluid pressure source, passage means controlled by said control valving for directing pressure from said source to said fluid pressure responsive servos, said control valving in the drive range position of said drive range selective valve being effective to instill direct pressure to said first clutch to engage the same, said first clutch and said first-mentioned one-way brake being engaged to establish first gear drive, said control valving being movable to direct pressure to said second-mentioned disc brake to engage the same, said first clutch and said second disc brake being effective to establish second speed drive when engaged, said control valving being movable to direct pressure to said second clutch servo to engage said second clutch, said first and second clutches and said second disc brake being engaged to establish direct drive, said control valving being positioned to direct pressure said first-mentioned clutch servo, to said second disc brake servo and to said brake band servo upon movement of said drive range selector valve to said intermediate drive range position to provide initial second gear drive, and to provide overrun braking in second gear drive, said control valving being conditioned to direct pressure to said second clutch servo and to said first disc brake servo upon movement of said drive range selector valve to its low range position to provide first gear drive and to provide overrun braking in first gear drive.

3. In a transmission having planetary gearing and having means including fluid pressure responsive servos for establishing different transmission drive ratios, a fluid pressure source, passage means for conducting pressure from said source to said servos, valve means for controlling admission of fluid to said servos through said passage means, said valve means including first and second shift valves for directing pressure to said servos and movable from a downshift to an upshift position, a manually operable detent valve movable from a first range of movement to a first detent position and further movable to a second detent position, a detent pressure regulator valve for delivering a fixed pressure to said detent valve, valve means for delivering a variable modulator pressure to said detent valve, said detent valve in said first range of movement delivering modulator pressure to both of said shift valves through a first passage for biasing said valves toward their downshift position, said detent valve in its first detent position being effective to deliver modulator pressure to said shift valves through said first passage and to deliver modulator pressure to one of said shift valves through a second passage for biasing said shift valves toward downshift position, said detent valve in its second detent position being effective to deliver modulator pressure to said first and second shift valves through said first and second passages and to deliver said fixed pressure to said shift valve through a third passage for biasing said valve toward said downshift position, and speed responsive governor means for biasing said shift valves toward their upshift position.

4. In a transmission as set forth in claim 3, a forward drive clutch actuated by one of said servos, a second speed disc brake actuated by a second of said servos and a direct drive clutch actuated by a third of said servos, said shift valves being effective in one position thereof to deliver fluid pressure through said passage means to both of said clutch servos and to said disc brake servo to provide direct drive through said transmission, said passage means including a second gear brake apply passage and a direct drive clutch apply passage controlled by said shift valves, an accumulator in said direct drive clutch apply passage, said accumulator including a piston, a spring for biasing said piston in one direction, a chamber on the side of said piston opposite said spring connected to said second gear disc brake apply passage and a chamber on the same side of said piston as said spring connected to said direct drive clutch apply passage, an accumulator timing valve in said direct drive clutch apply passage for permitting rapid flow of fluid pressure to said accumulator spring chamber when said shift valves are positioned for direct drive, said accumulator timing valve being movable upon movement of one of said shift valves to its second speed position to permit initial rapid flow of fluid from said accumulator spring chamber when the pressure in said chamber exceeds a predetermined pressure, a restriction in parallel with said accumulator timing valve, said timing valve being closed upon drop of pressure in said accumulator spring chamber below said predetermined pressure to delay release of said direct drive clutch and to provide an interval of clutch slippage during a shift from second gear drive to direct drive.

5. A transmission as set forth in claim 3 including a second gear disc brake adapted to be engaged in response to fluid pressure supplied thereto, said passage means including a second gear disc brake apply passage, a first to second gear shift valve for controlling admission of pressure to said second gear disc brake apply passage, a shift accumulator including a piston, a spring for biasing said piston in one direction, a first chamber connected to said source for biasing said piston against said spring, a second chamber in the same side of said piston as said spring connected to said disc brake apply passage, said shift valve being movable to connect said second disc brake apply passage to pressure to establish second gear drive, being operable to provide an interval of disc brake slippage when shifting from first gear to second gear drive.

References Cited

UNITED STATES PATENTS

| | | | |
|---|---|---|---|
| 3,077,122 | 2/1963 | Olsen | 74—869 X |
| 3,296,884 | 1/1967 | Leonard | 74—869 X |
| 3,307,430 | 3/1967 | Bawder | 74—763 |
| 3,321,999 | 5/1967 | Greer | 74—763 |
| 3,362,261 | 1/1968 | Synder et al. | 74—869 X |
| 3,393,585 | 7/1968 | Pierce | 74—869 X |

ARTHUR T. McKEON, Primary Examiner

U.S. Cl. X.R.

74—869

PO-1050
(5/69)

UNITED STATES PATENT OFFICE
CERTIFICATE OF CORRECTION

Patent No. 3,541,887    Dated November 24, 1970

Inventor(s) Henri J. Van Lent, John E. Mahoney and Leo G. Stein

It is certified that error appears in the above-identified patent and that said Letters Patent are hereby corrected as shown below:

Column 2, line 18, change "detent the" to -- the detent -- ;
Column 8, line 15, change "pressure 258 passage" to
                          -- pressure passage 258 -- ;
         line 16, delete "smoth" and insert -- smooth -- ;
Column 10, line 1, delete "249." and insert -- 249, -- ;
          line 22, delete "troque" and insert -- torque -- ;
          line 24, delete "carrier 26" and insert -- carrier
                          27 -- ;
          line 55, in the sub-heading delete "Second Gear
                          Downshift" and insert -- Second Downshift
Column 11, line 22, delete "therefore" and insert
                          -- heretofore -- ;
Column 12, line 26, after '188 of detent valve 180', delete
                          "to detent valve 180" ;
Column 13, line 45, after 'line pressure' insert, -- passage
Column 14, line 14, delete "153" and insert -- 253 -- ;
          line 49, delete "223" and insert -- 233 -- ;
Column 15, line 2, delete "137" and insert -- 247 -- .

Signed and sealed this 4th day of May 1971.

(SEAL)
Attest:

EDWARD M. FLETCHER, JR.         WILLIAM E. SCHUYLER, JR.
Attesting Officer               Commissioner of Patents